United States Patent Office 3,011,843
Patented Dec. 5, 1961

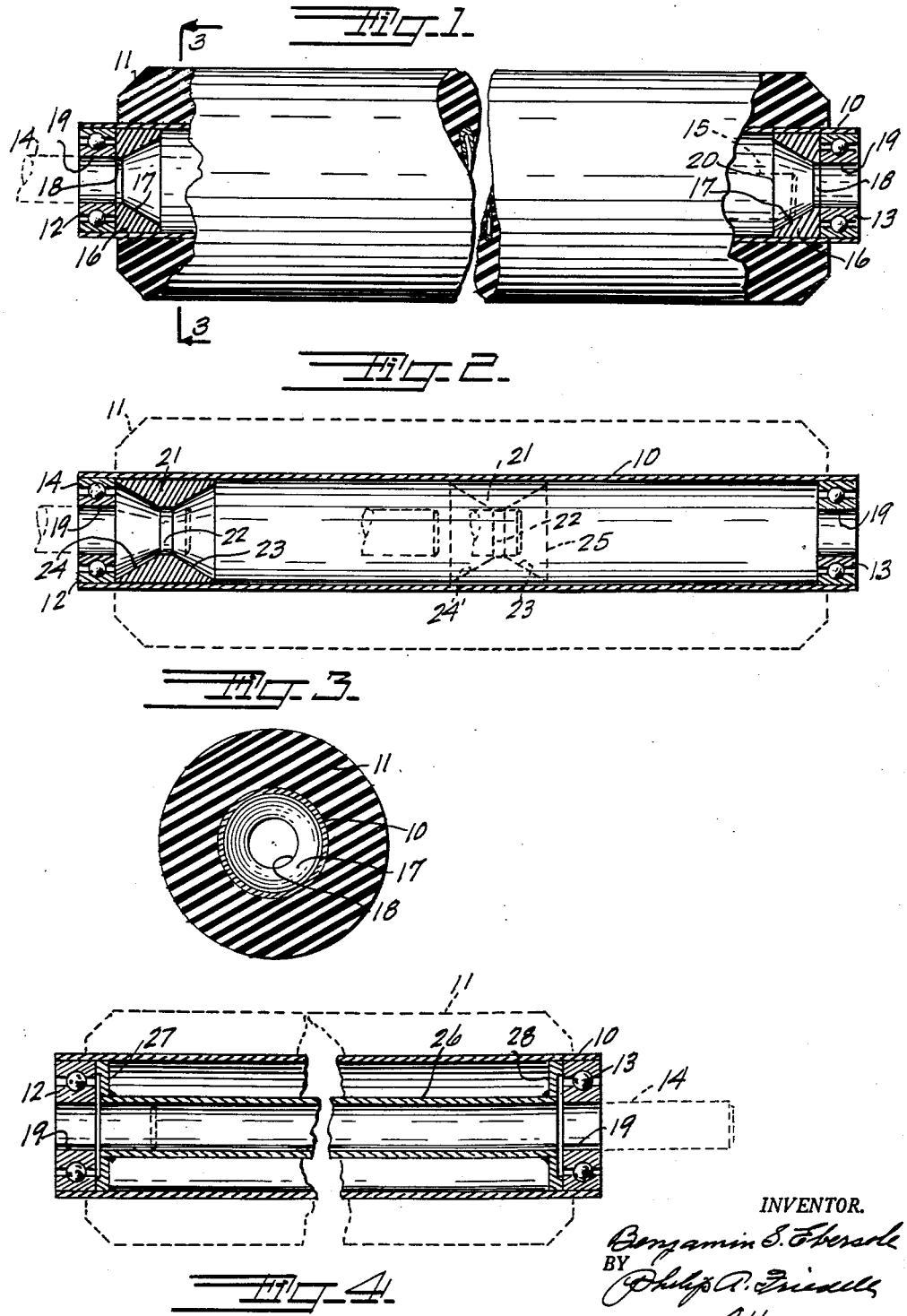

3,011,843
IDLING ROLLERS
Benjamin S. Ebersole, 212 Mission St.,
San Francisco 5, Calif.
Filed Oct. 29, 1957, Ser. No. 693,170
2 Claims. (Cl. 308—190)

This invention relates to improvements in idling rollers, and particularly relates to idling rollers for off-set printing presses and the like in which the roller runs freely on a shaft, the roller having a bearing at each end while the shaft is secured against rotation, though not so limited.

The insertion of the shaft in one of these idling rollers is usually a tedious, nerve tensioning and time consuming operation since the bearing at the insertion end permits the shaft to veer from the axis of the bearing at the exit end, thus requiring a great deal of patience and time before the shaft can be worked to the proper position to enter the exit bearing. This tedious and difficult operation is eliminated by my shaft guide which guides the shaft directly to the exit bearing, saving on patience and time, with resultant cost in wages and shutdown of the machine reduced to an absolute minimum.

The objects and advantages of the invention are as follows:

First, to provide shaft guiding means within an idling roller for axially aligning the shaft with the exit bearing for quick and unimpeded replacement of the shaft in the roller.

Second, to provide a roller having a tubular core with a bearing at each end with intervening axial aligning means for direct passage of a shaft through both bearings uninterruptedly.

Third, to provide means as outlined which is simple in construction and economical to produce, and which can be applied to existent or new rollers.

In describing the invention reference will be had to the accompanying drawings, in which:

FIG. 1 illustrates an idling roller for an off-set printing press, with the invention applied thereto, the roller being broken and partly in section.

FIG. 2 is a modification of the invention shown in section and in which a single two-way guide is used.

FIG. 3 is a section taken on line 3—3 of FIG. 1.

FIG. 4 is another modification in which a tubular guide is used and extends throughout the space between the bearings, and is also shown in section, with a central portion broken out.

The conventional roller for an off-set printing press consists of a tubular core 10 on which is fixed such as by vulcanizing the rubber 11. A bearing is fixed in each end of the core as indicated at 12 and 13, and a shaft 14 frictionally fits in the inner race of the ball bearing or has a running fit in a bushing bearing when used.

As will be noted, when the shaft 14 is to be inserted, and is inserted as indicated through the bearing 12, the shaft sags as indicated at 15, and to work the shaft to where it will enter the bore in the bearing 11 is a very tedious and time consuming job, and to overcome such undesirable features, a guide is provided for the shaft and which will guide the shaft end directly into the bore of the bearing.

This guiding means, in the form illustrated in FIG. 1, consists of a member 16 having a conical bore 17 terminating in a cylindrical bore 18 in axial alignment with the bore 19 in the bearing, the member being fixed in the core 10 adjacent to the bearing as shown, and a duplicate member being mounted in cooperative relation to the other end bearing as indicated at 20.

With this arrangement, the shaft 14 is inserted through one bearing as 12 and will sag in the customary way but upon reaching the other bearing will ride the inclined surface of the guide member, into the cylindrical bore 18 where it is brought into axial alignment with the bore 19 in the bearing.

FIG. 2 illustrates a modification which can be used in either of two ways, and consists of a single guide member 21 which has a conical bore formed in from each end and both terminating in a cylindrical aligning bore 22, the two conical bores 23 and 24 being opposed. In one arrangement, the guide member is slidable in the tubular core, with the aligning cylindrical bore fitting the shaft under slight friction, so that the shaft, upon insertion from the end as indicated in FIG. 2, and with the guide member at that end, will slide the guide member toward the other end as indicated at 25, or, if the guide member is in some intermediate position, the sagging shaft will slide the guide member to the other bearing where the inclined surface of the conical bore will carry the shaft into the axial aligning bore to pass directly into the bore in the other bearing.

FIG. 4 illustrates another modification, in which a sleeve 26 having a bore slidably receiving the shaft, is supported in axial alignment with the bores in the bearings, and is indicated as supported by spiders or washers 27 and 28. In this type, the shaft merely passes through the first bearing, on through the sleeve directly into and through the other bearing.

In connection with the modification illustrated in FIG. 2, the guide member can be fixed about centrally of the length as indicated by the dotted figure at 25, which will guide and properly support the shaft for insertion from either end of the roller.

I claim:

1. In a roller having a shaft and bearings therefor, shaft guiding means for said bearings comprising a tubular sleeve fixed in said roller and having said bearings fixedly mounted in the respective ends thereof, a cylindrical member slidable in said sleeve and having a conical bore formed axially in each end with the conical bores having an initial diameter substantially equal to the external diameter of the cylindrical member and terminating in an intermediate axial bore slidably receiving the shaft when the shaft is inserted through the bearing at one end with the shaft moving the cylindrical member toward the other end to guide the shaft for precise alignment with the bearing at the other end.

2. A roller, a sleeve axially mounted in said roller, a bearing fixed in each end of said sleeve, a guide slidable in said sleeve, a shaft slidable through said bearings and cooperative with said guide following insertion through one bearing for moving the guide into cooperative relation to the other bearing, said guide having an axial bore slidably receiving said shaft and being countersunk axially to guide the shaft into the axial bore for axially aligning the shaft for insertion into the other bearing.

References Cited in the file of this patent

UNITED STATES PATENTS

| | | |
|---|---|---|
| 2,287,357 | Nyborg | June 23, 1942 |
| 2,674,966 | Morris | Apr. 13, 1954 |
| 2,687,799 | Saxe | Aug. 31, 1954 |